United States Patent
Vedullapalli et al.

(10) Patent No.: US 7,117,429 B2
(45) Date of Patent: Oct. 3, 2006

(54) METHODS AND SYSTEMS FOR MANAGING STYLES ELECTRONIC DOCUMENTS

(75) Inventors: Chaitra Vedullapalli, Fremont, CA (US); Andrew A. Brown, Livermore, CA (US); David E. Watson, Emigrant, MT (US)

(73) Assignee: Oracle International Corporation, Redwood Shores, CA (US)

( * ) Notice: Subject to any disclaimer, the term of this patent is extended or adjusted under 35 U.S.C. 154(b) by 513 days.

(21) Appl. No.: 10/171,271

(22) Filed: Jun. 12, 2002

(65) Prior Publication Data

US 2003/0233620 A1   Dec. 18, 2003

(51) Int. Cl.
*G06F 15/00* (2006.01)

(52) U.S. Cl. ........................... 715/500; 715/513
(58) Field of Classification Search ............... 715/513, 715/501.1, 500, 530, 517
See application file for complete search history.

(56) References Cited

U.S. PATENT DOCUMENTS

| | | | | |
|---|---|---|---|---|
| 5,566,289 A * | 10/1996 | Ikeo et al. | .................. | 715/517 |
| 5,860,073 A | 1/1999 | Ferrel et al. | | |
| 6,012,098 A * | 1/2000 | Bayeh et al. | .............. | 709/246 |
| 6,023,714 A * | 2/2000 | Hill et al. | .................. | 715/513 |
| 6,463,440 B1 * | 10/2002 | Hind et al. | ................. | 707/102 |
| 6,587,849 B1 * | 7/2003 | Mason et al. | ................. | 707/5 |
| 6,675,355 B1 * | 1/2004 | Demopoulos et al. | ...... | 715/513 |
| 6,792,577 B1 * | 9/2004 | Kimoto | ...................... | 715/522 |
| 6,799,299 B1 * | 9/2004 | Li et al. | ...................... | 715/513 |
| 6,910,182 B1 * | 6/2005 | Huang | ........................ | 715/514 |
| 2001/0044809 A1 * | 11/2001 | Parasnis et al. | ............. | 707/513 |
| 2002/0049790 A1 * | 4/2002 | Ricker et al. | ............... | 707/513 |
| 2002/0065852 A1 * | 5/2002 | Hendrickson et al. | ...... | 707/517 |
| 2002/0133519 A1 * | 9/2002 | Prinzing | ..................... | 707/517 |
| 2002/0143818 A1 * | 10/2002 | Roberts et al. | ............. | 707/513 |
| 2002/0169803 A1 * | 11/2002 | Sampath et al. | ............ | 707/513 |
| 2002/0198743 A1 * | 12/2002 | Ariathurai et al. | ............. | 705/4 |
| 2003/0033607 A1 * | 2/2003 | Schwalb | ..................... | 725/112 |
| 2003/0084405 A1 * | 5/2003 | Ito et al. | ..................... | 715/513 |
| 2003/0174165 A1 * | 9/2003 | Barney | ........................ | 345/747 |
| 2003/0204814 A1 * | 10/2003 | Elo et al. | ..................... | 715/513 |
| 2004/0003347 A1 * | 1/2004 | Saidenberg et al. | ......... | 715/511 |
| 2004/0025114 A1 * | 2/2004 | Hiebert | ....................... | 715/513 |
| 2004/0177321 A1 * | 9/2004 | Brown et al. | ............... | 715/513 |

(Continued)

FOREIGN PATENT DOCUMENTS

WO    WO 02/42928 A1    5/2002

OTHER PUBLICATIONS

Royappa, Implementing Catalog Clearinghouses with XML and SXL, ACM 1998, pp. 616-623.*

(Continued)

*Primary Examiner*—Cong-Lac Huynh
(74) *Attorney, Agent, or Firm*—Young Law Firm, P.C.

(57) ABSTRACT

A computer-implemented method of managing an appearance of electronic documents includes defining a first style sheet, the first style sheet including a style, the style including an attribute and a value associated with the attribute. The defined first style sheet, the attribute and the value may then be stored in a database driven repository at a first identified location. A first linking statement referencing the identified first location may then be generated. The generated first linking statement may then be embedded in a first electronic document such that when the electronic document is rendered, execution of the first linking statement causes the stored first style sheet to be accessed at the identified location and the style included in the first style sheet applied to the first electronic document.

19 Claims, 8 Drawing Sheets

U.S. PATENT DOCUMENTS

2004/0205574 A1* 10/2004 Sayers et al. ............... 715/513
2004/0210556 A1* 10/2004 Brooke et al. ................. 707/1

OTHER PUBLICATIONS

Bry et al., Advanced Modeling and Browsing of Technical Documents, ACM 2002, pp. 520-524.*
Lie et al., Multipurpos Web Publishing, ACM 1999, pp. 95-101.*
Badros et al., Constraint Cascading Style Sheets for the Web, ACM 1999, pp. 73-82.*
Badros et al., Constraint Cascading Style Sheets for the Web, ACM 1999, pp. 73-82.*
"Style Master—Working with CSSI Properties" WESTCIV.COM, 'Online!, Feb. 2, 2002, XP002268415, Retrieved from the Internet: http://tinyurl.com/yw8cf>'retrieved on Jan. 28, 2004.
Office Action mailed Apr. 7, 2005, in corresponding European Patent Application No. 03 760 197.8-1527.
International Search Report mailed Feb. 16, 2004, in corresponding International Application No. PCT/US03/10156, filed Apr. 3, 2003 (5pgs).
Written Opinion mailed Mar. 28, 2005, in corresponding International Application No. PCT/US03/10156, filed Apr. 3, 2003 (5pgs).
International Preliminary Examination Report mailed Aug. 22, 2005, in corresponding International Application No. PCT/US03/10156, filed Apr. 3, 2003 (5pgs).

* cited by examiner

METHODS AND SYSTEMS FOR MANAGING STYLES ELECTRONIC DOCUMENTS

BACKGROUND OF THE INVENTION

1. Field of the Invention

The present invention generally relates to methods and systems for managing styles and style sheets in electronic documents such as, for example, HTML documents.

2. Description of the Related Art

HTML (Hyper Text Markup Language) tags were originally designed to define the appearance of electronic documents. Their function is to denote the formatting of elements within a document, such as headers, paragraphs and tables using tags such as <h1>, <p>, <table>, respectively. However, as the two major browsers (Netscape and Internet Explorer) continued to add new HTML tags and attributes (such as the <font> tag and the color attribute) to the original HTML specification, it has become more and more difficult to create Web sites where the content of HTML documents was clearly separated from the document's presentation layout.

To solve this problem, the World Wide Web Consortium (W3C)—the non-profit, standard setting consortium responsible for standardizing HTML—created STYLES in addition to HTML 4.0. Beginning with version 4.0, both the Netscape and Internet Explorer browsers began supporting Cascading Style Sheets (CSS). CSS Styles in HTML 4.0 define how HTML elements are displayed, just like the font tag and the color attribute in HTML 3.2. CSS Styles are normally saved in files that are external to the HTML documents whose styles they control. Indeed, external style sheets enable the appearance and layout of all the pages in a Web site that reference the external style sheet to be changed, just by editing a single CSS document. For example, the font or color of all the headings in all of the pages of a Web site may be changed by making a single change to an external style sheet, thereby obviating the need to edit each and every page to effectuate the desired font and heading changes.

Problems arise, however, when data administrators are faced with defining, implementing, enforcing and maintaining CSS style standards for a complex Web site. To avoid hard coding CSS styles into the static or dynamic Web pages, CSS styles sheets are normally saved as external files. This enables the developers to implement stylesheets based on the need. However, precisely because these stylesheets are hard coded, implementing stylistic changes requires a great deal of effort and typically delays the release of new versions. To free the content owners of the need to implement such stylistic changes themselves, the stylesheets may be maintained by developers rather than content owners. However, this decreases the ability of content owners to flexibly and dynamically define the look and feel of their content. Since the content owners have no access to define the style sheets, they often resort to various ad hoc methods to locally hardcode styles into their static Web pages. Over time, this may lead to an inconsistent look and feel throughout the Web Therefore, the problems encountered during development and maintenance of Web sites or applications include high maintenance, difficulty in understanding how stylistic changes are implemented on the part of content owners, project delays occasioned by the necessity of having to revise the site or application to achieve a consistent look and feel, little or no reuse of style sheets and no reporting feature to ascertain which styles are used in which style sheets and which style sheets are used in which documents.

Tools exist that enable the creation of external style sheets. However, such tools only help in creating external style sheets but do not resolve the above-identified problems. There is a need, therefore, for methods and systems for intelligently managing style sheets, styles and associated attributes to enable content owners themselves to achieve a consistent look and feel to their Web sites and applications, to allow ready re-use of previously defined styles and style sheets, among other functions.

SUMMARY OF THE INVENTION

It is, therefore, an object of the present invention to provide methods and systems for managing style sheets that define the styles to be applied to electronic documents, such as XML or HTML documents, for example.

In accordance with the above-described objects and those that will be mentioned and will become apparent below, a computer implemented method of enabling the management of styles in electronic documents, according to an embodiment of the present invention may include steps of providing an attribute list that includes a plurality of stored attributes, each stored attribute defining a content-independent property of an element in an electronic document; enabling a selection of at least one attribute from the attribute list and enabling a selection of a value for each selected attribute to define at least one uniquely identifiable style; providing a style list that includes at least one of a stored style and the defined style; enabling a selection of at least one style from the provided style list to define a style sheet, the defined style sheet being configured to control an appearance of the electronic document upon being linked thereto, and enabling a generation of a linking statement to link the defined style sheet to the electronic document.

A step may be carried out to embed the generated linking statement in the electronic document. In this manner, the embedded linking statement enables the appearance of the electronic document to be controlled by the defined style sheet when the electronic document is rendered. The electronic document may include XML or HTML, for example. The electronic document may include a Web page. The method may further include enabling a modification of a style associated with a predefined tag. The method may also include enabling a selection of attributes from a predefined pick list and associated attribute values to define the new style. The retrieval of a stored style sheet from the repository may be enabled. The style(s) of the retrieved style sheet may be modified and the method may further enable the generation and embedding of a linking statement referencing the modified style sheet in the electronic document. The method may also enable a selective generation of configurable reports to selectively match electronic documents with at least one of attributes, styles and style sheets.

According to another embodiment thereof, the present invention is a system for controlling an appearance of an electronic document, comprising a database driven repository, the repository being configured to store a plurality of attributes, a plurality of styles and a plurality of style sheets, each stored attribute defining a content-independent property of an element in the electronic document, each style including a plurality of selected attributes and each style sheet including at least one selected style, and a style manager application configured to selectively access the repository to create a new style sheet defined by at least one of the plurality of stored styles or at least one new style, to manage the plurality of stored style sheets and to generate a linking statement, the linking statement referencing the new style sheet or a selected one of the plurality of stored style sheets, the style sheet referenced by the linking statement controlling the appearance of the electronic document.

The style manager application may be further configured to embed the generated linking statement in the electronic document. The electronic document may include XML or HTML, for example. For example, the electronic document may be or include a Web page. The style manager application may be further configured to modify a style associated with a predefined tag. The style manager application may further be configured to enable a selection of attributes from a predefined pick list and associated attribute values to define the new style. The style manager application may be further configured to retrieve a stored style sheet from the repository and to enable the style(s) to be modified and to generate and embed a linking statement to the modified style sheet in the electronic document. The style manager application may be further configured to enable a selective generation of configurable reports to selectively match electronic documents with at least one of attributes, styles and style sheets.

According to still another embodiment thereof, the present invention is a computer-implemented method of managing an appearance of electronic documents, comprising the steps of defining a first style sheet, the first style sheet including a style, the style including an attribute and a value associated with the attribute; storing the defined first style sheet, the attribute and the value in a database driven repository at a first identified location; generating a first linking statement referencing the identified first location; embedding the generated first linking statement in a first electronic document such that when the electronic document is rendered, execution of the first linking statement causing the stored first style sheet to be accessed at the identified location and the style included in the first style sheet applied to the first electronic document.

The method may further include a step of retrieving the stored first style sheet at the first identified location, modifying the retrieved style sheet to create a second style sheet, storing the second style sheet in the database driven repository at a second identified location, generating a second linking statement referencing the second style sheet at the second identified location and embedding the generated second linking statement in a second electronic document. A step of embedding the first linking statement in a second electronic document may also be carried out. A step of generating a report detailing all electronic documents in which the first linking statement has been embedded may also be carried out. A report may also be generated detailing all electronic documents whose appearance is at least partially controlled by a selected style, style sheet and/or attribute.

BRIEF DESCRIPTION OF THE DRAWINGS

For a further understanding of the objects and advantages of the present invention, reference should be had to the following detailed description, taken in conjunction with the accompanying figures, wherein.

DESCRIPTION OF THE INVENTION

Functional Description

Figure 1:
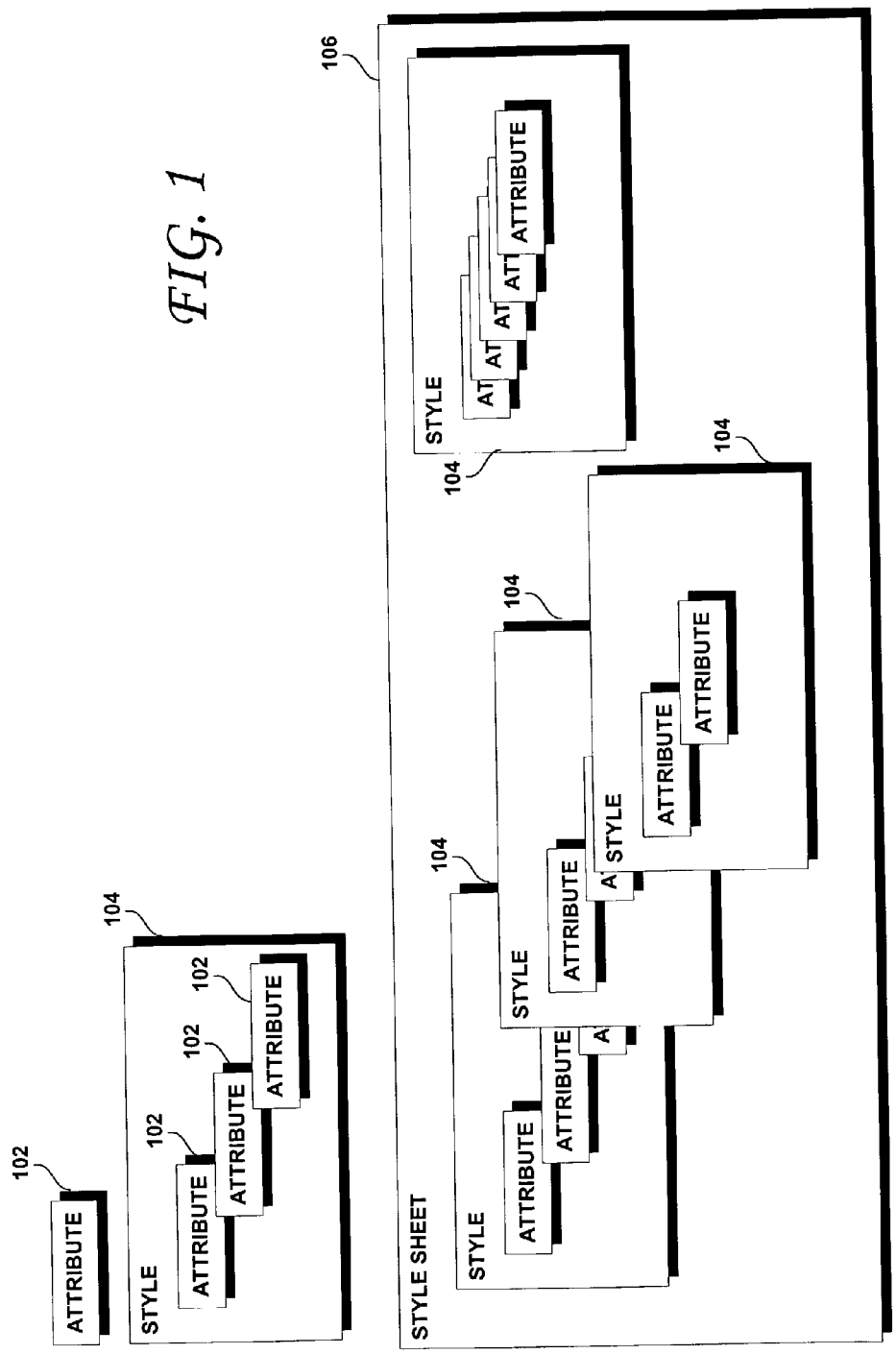
FIG. 1 depicts attributes, styles and style sheets, as utilized by the present invention.

FIG. 1 shows attributes, styles and style sheets, as utilized by the present invention. According to the present invention, an attribute 102 is a visible, content-independent property of an element of the electronic document. For example, attributes may include color, a font family, height, text style and the like. Attributes 102 are the building blocks of styles, as shown at 104. That is, a style 104 is a group of attributes 102 that is identified by a single name. For example, a style 104 may include attributes defining the font (e.g., Arial), a font size (e.g., 12 pt.), a font style (e.g., normal), a font weight (e.g., normal) and a color (e.g., #000000). Such an exemplary style 104 may control the formatting of a text block, for example, within an electronic document. A style sheet 106, according to the present invent, may define the appearance of one or more electronic documents, such as World Wide Web (hereafter, "Web") pages, for example. A style sheet 106 may include one or more styles 104.

Figure 2:
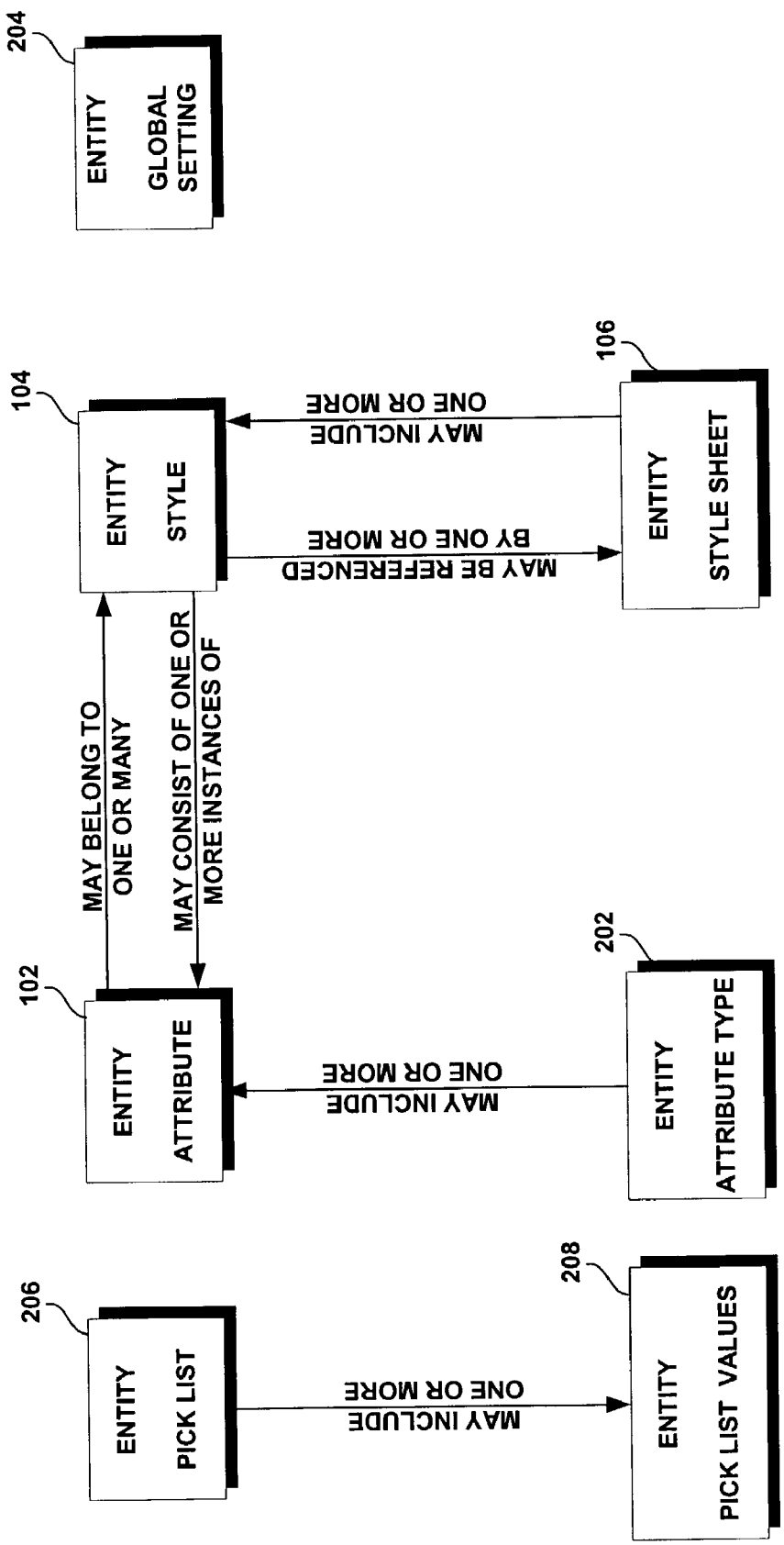
FIG. 2 shows a data model according to an embodiment of the present invention.

FIG. 2 shows a data model of the style sheets and the constituent parts thereof, according to an embodiment of the present invention. As shown, an attribute 102 is an instance of attribute type 202. An attribute type 202, according to the present invention, may include color, size, font family or any class that includes a plurality of instances. For example, the "color" attribute type may include instances including blue, green and red. The "size" attribute type may include, for example, instances such as small medium and large. As shown in FIG. 2, an attribute type 202 may include a plurality of attributes 102. Similarly, an attribute 102 may belong to one or more styles 104. Conversely, a style 104 may consist of one or more instances of attributes 102, as also shown in FIG. 1. Therefore, a same attribute instance (e.g., the Arial font) may belong to one or more styles 104 (or may not belong to any style 104). Likewise, a style 104 may be referenced by one or more style sheets 106. That is, a same style 104 may be included in more than one style sheet 106, thereby promoting reuse of previously defined styles 104 and a more homogeneous look across multiple electronic documents (such as constituent pages of a Web site). As also shown in FIG. 1, a style sheet 106 may include one or more styles 104, which may or may not be shared by other style sheets 106. As will be detailed further below, a number of global settings 204 may be set and/or modified, to affect the operation of the present style manager invention. Each entity 102, 104, 106, 204 may be associated with a pick list 206 from which a number of values 208 for entity may be selected. The pick list 206 may be seeded with a predetermined number of pick list values 208 appropriate to the element for which the values are selected. Moreover, the present invention also includes functionality to define new pick list values 208 for the elements 102, 104, 106 and/or 204. For example, for the font size attribute, the pick list 206 may be initially seeded with pick list values 208 corresponding to point (pt) values of 6, 8, 10, 12, 14, 16 and 20. Other point size values, such as 22 pt, may be defined and added to the pick list values 208 in the pick list 206 for the font size attribute.

Figure 3:
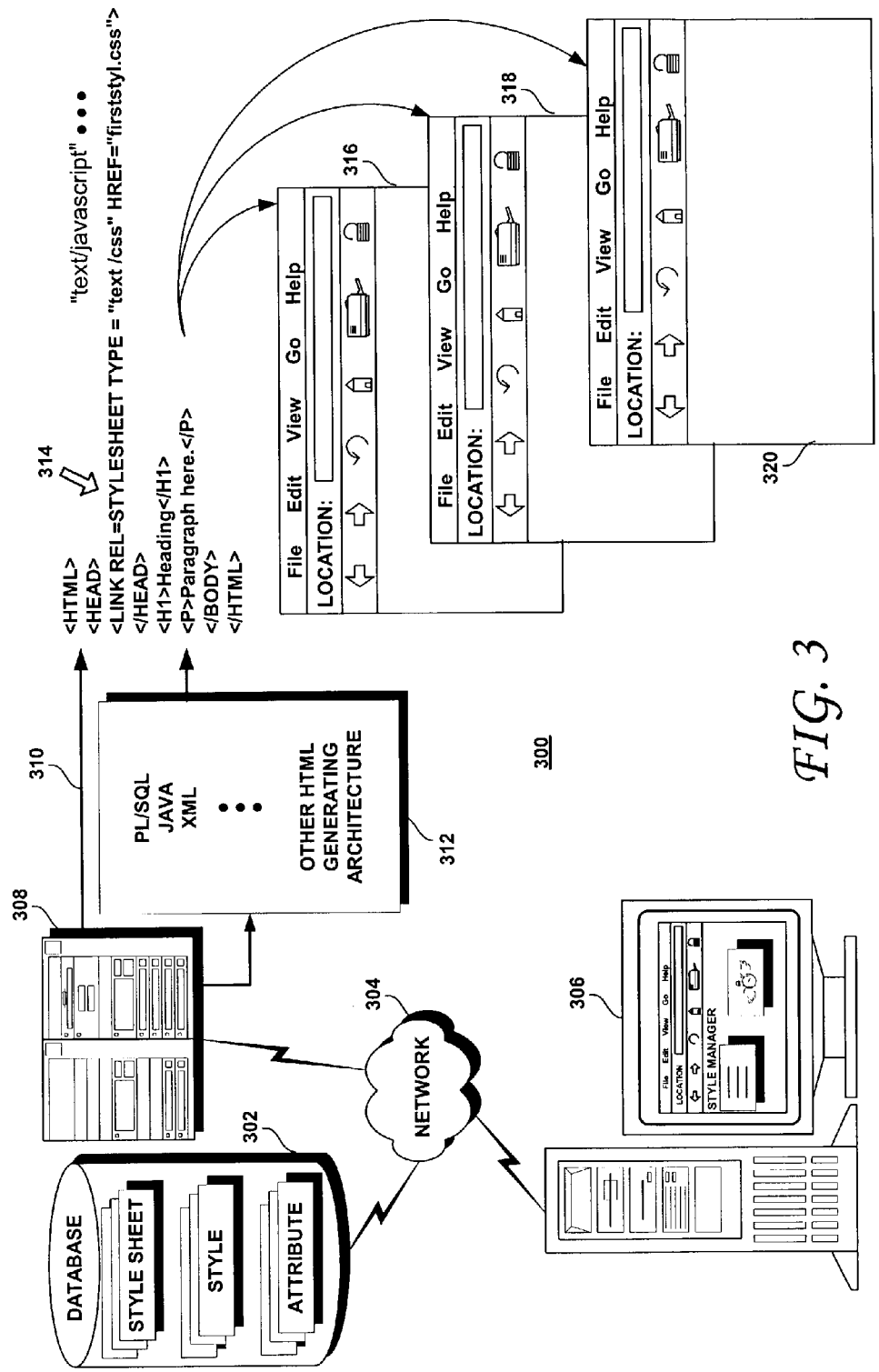
FIG. 3 shows various entities, according to an embodiment of the present invention.

FIG. 3 shows a system 300 for managing styles in electronic documents, according to an embodiment of the present invention. As shown therein, the system 300 includes a database driven centralized repository 302. The database driven repository 302, according to the present invention, may be configured to store a plurality of attributes, a plurality of styles and a plurality of style sheets, as shown in FIG. 1 at reference numerals 102, 104 and 106, respectively. Each stored attribute 102 defines a content-independent property of an element in an electronic document, such as shown at 316, 318 and 320. In turn, each style 104 may include a plurality of selected attributes 102. Lastly, each style sheet 106 includes one or more selected styles 104. The database driven repository 302 may include, for example, an instance of a database, such as an Oracle database. The present invention may be embodied as a standalone Web application run from a computer 306 having access to the database driven repository 302 or may be incorporated in other applications to provide a sophisticated mechanism for defining the look and feel of Web sites or other electronic documents that reference external style sheets.

The style manager application incorporating the present invention is configured to generate a linking statement, such as shown at reference numeral 314. The generated linking statement 314 references a selected one of the external style sheets 106 stored in the database driven repository 302 at respective identified (and unique) locations therein. The linking statement 314 may be manually cut and pasted as suggested by arrow 310 in FIG. 3 into the processing instructions of the electronic document or may be automatically inserted therein. The present invention is also compatible with other HTML generating architectures, such as PL/SQL, JAVA® and XML, for example, as indicated at reference numeral 312. When the electronic document is rendered for a requesting computer over the network 304, a Web server 308, in response to a request for an electronic document, may access the location within the database driven repository 302 identified by the linking statement 314 to access the external style sheet 106 stored there at and provide the electronic document to the requesting computer. The provided electronic document will be formatted according to the style(s) identified in the accessed style sheet 106 referenced by the embedded linking statement 314. Therefore, according to the present invention, style sheets 106 and their constituent styles 104, attributes 102 and attribute values may be stored in a centralized database driven repository, such as shown at 302. The full power of relational database management systems (RDMS) may then be brought to bear on the management of the stored style sheets, styles and attributes. Attributes 102 may then be freely chosen, defined and/or modified to define styles 104 and styles (whether newly defined or previously stored) may then be used to define new, modified or existing style sheets 106. Linking statements referencing the new or modified stored style sheet 106 may then be generated and embedded directly into one or more selected electronic documents to control the appearance thereof when rendered. The present invention may also be used to redefine existing tags, such as HTML tags. For example, an existing HTML tag may be redefined to include a different style or to modify an existing style 104 to include different constituent attributes 102 and/or attribute values.

According to the present invention, the database driven repository 302 may be queried to gather selected reporting information, using PL/SQL commands, for example. For example, a report may be constructed to list all of the electronic documents that use a selected style sheet 106. Alternatively, a report may be constructed to list all electronic documents that reference style sheets 106 containing a selected attribute or attributes 102. Alternatively still, a report may be constructed to list all style sheets 106 containing a selected attribute or attributes 102. Such reporting features enable realistic assessment of the consequences of proposed stylistic changes to existing style sheets 106, styles 104 or attributes 102. In other words, using such reporting feature, a content provider may, at a glance, view the impact of a proposed change of styles 104 (for example) on a complex Web site before such changes are implemented.

In this manner, the present invention provides immediate feedback of any changes to the look and feel of a Web site or other electronic document or collection of electronic documents whose appearance is dictated by one or more external style sheets. This places management of the Web site look and feel directly into the hands of the Web site administrators or content owners. The reporting features enable administrators and content owners with a resource to identify the impact of making look and feel changes. Therefore, the present invention provides a framework for separating the look and feel from the content of the electronic documents, placing presentation management into the hands of the content owners, and allowing application development to concentrate on delivering the functionality of the application. Indeed, the present invention obviates the need to locally hard code styles in electronic documents and provides a centralized repository and management system for styles 104 and styles sheets 106 accessed by electronic documents. The present style manager invention, therefore, simplifies and speeds up the process of evolving the standard look and feel of electronic documents such as Web pages 316, 318 and 320. Prior to the present invention, such changes to the styles 104 would require significant and repetitive code changes and would likely result in inconsistencies of look and feel throughout the electronic documents over time.

Figure 4:
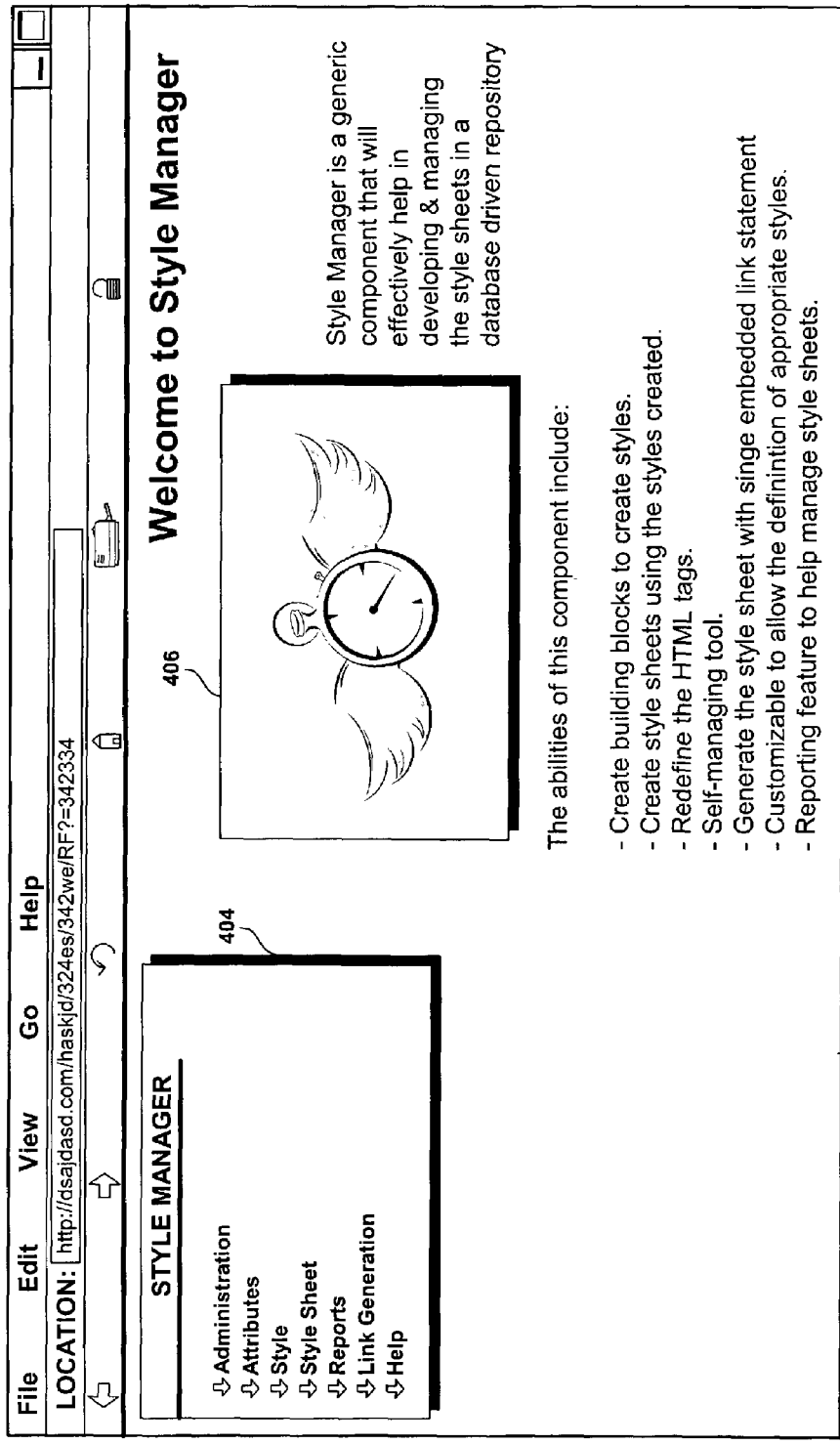
FIG. 4 shows a system for managing styles in electronic documents, according to an embodiment of the present invention.
Figure 6:
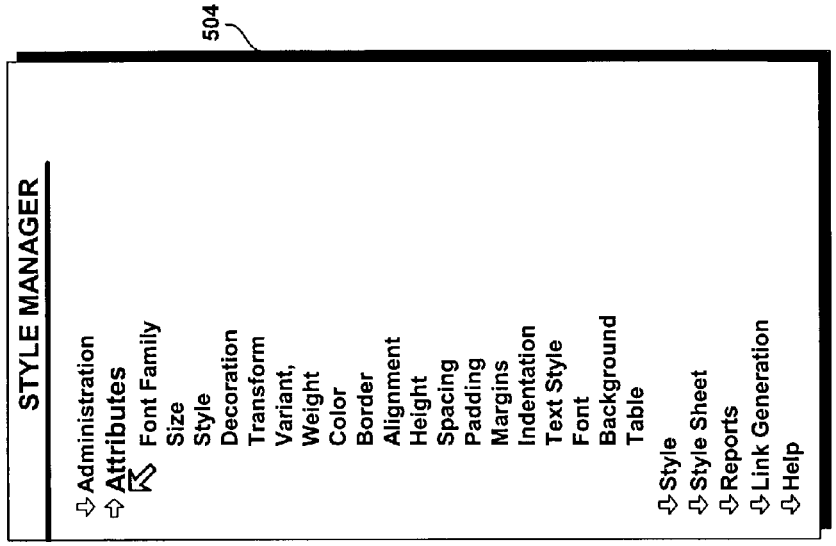
FIG. 6 shows further aspects of the application or tool for managing styles in electronic documents of the present invention.
Figure 5:
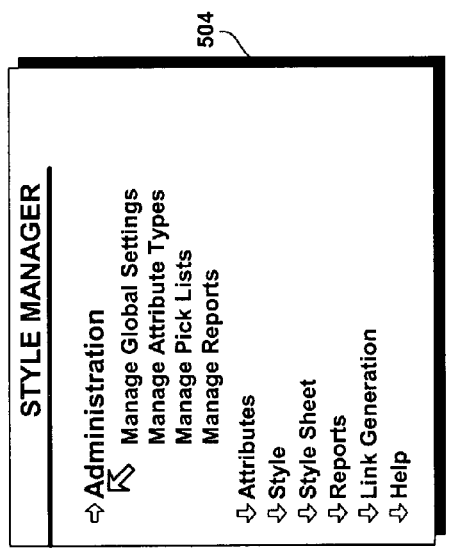
FIG. 5 shows an embodiment of a first screen of an application or tool for managing styles in electronic documents, according to the present invention.

FIG. 4 shows an embodiment of a first screen of an exemplary application or tool for managing styles in electronic documents, according to the present invention. As shown therein, the present invention may be embodied as a Web-based application 400 rendered upon a browser 402. According to one embodiment thereof, such a Web-based application may include a control panel 404 in which the user may select Administration to configure the application itself, Attributes to manage attributes of electronic documents, Style to manage styles of an electronic document, Style Sheet to manage the style sheets stored on the database driven repository 302, Reports to generate and customize reports relative to the attributes, styles and style sheets, Link Generation to generate a linking statement to link the electronic documents to the style sheets maintained in the repository 302 and Help to obtain help for any of the functionality of the application. Upon selecting Administration, the user may customize the look and feel and operation of the application embodying the present invention, including, for example, the introductory graphic 406, the presentation of the application's navigation buttons, graphics and the like. As shown in FIG. 5, selecting Administration from the control panel 404 may also enable the user to manage global variables, manage attribute types, manage pick lists and manage reports, for example. Selecting Attributes from the control panel 404 enables the user to manage attributes such as size, weight, color alignment, border text style, among many others, as shown in FIG. 6. Information associated with each attribute may also be stored in the database driven repository 302. Such information may include a last update date, an identifier of the last person to update the attribute, a name of the attribute, a description thereof, a listing of allowable values for the attribute, a display order for the attribute and the like. For example, upon selecting the size attribute, the user may be prompted to further select a pixel or point size, such as from 8 to 20 pixels or point. Moreover, the user may be given the opportunity to define another size that is not currently listed, such as, for example, 21 pt. Similar information may be stored for each attribute, such as the attributes shown in FIG. 6.

Similarly, selecting Style from the control panel 404 enables the user to manage (e.g., delete, add new, modify, rename, save) the styles 104 stored in the database driven repository 302, including, for example, the display order thereof, the name of the style, a description thereof, a tag of the style. The style name may be, for example, an HTML tag (such as H1, for example). Moreover, the user may be given the opportunity to create new styles 104 by enabling the user to select the constituent attributes 102 thereof. Selecting Style Sheet from the control panel 404 enables the user to manage (e.g., delete, add new, modify, rename, save) the style sheets 106 stored in the repository 302, including the order in which they are displayed, their description, their name, the name of the creator of the style sheet and the creation date thereof, for example. For example, an existing style sheet 106 may be modified by adding attributes 102 thereto. Thereafter, the appearance of any electronic document that references the modified style sheet 106 will be modified according to the added attributes. A single change to a style sheet 106 stored within the repository 302, therefore, may affect a great many electronic documents. Selecting Reports from the control panel 504 enables the user to create, generate and customize reports based upon the information stored in the database driven repository 302 of the present invention. For example, the application embodying the present invention may allow the user to change the display order and the name of the available reports, and the description thereof. A user, for example, may define and generate reports detailing which electronic document(s) is/are controlled by selected attributes 102, styles 104 and/or style sheets 106. Such a reporting feature enables the content provider to readily determine the effect of proposed style changes to the look and feel of any number of electronic documents.

Figure 7:
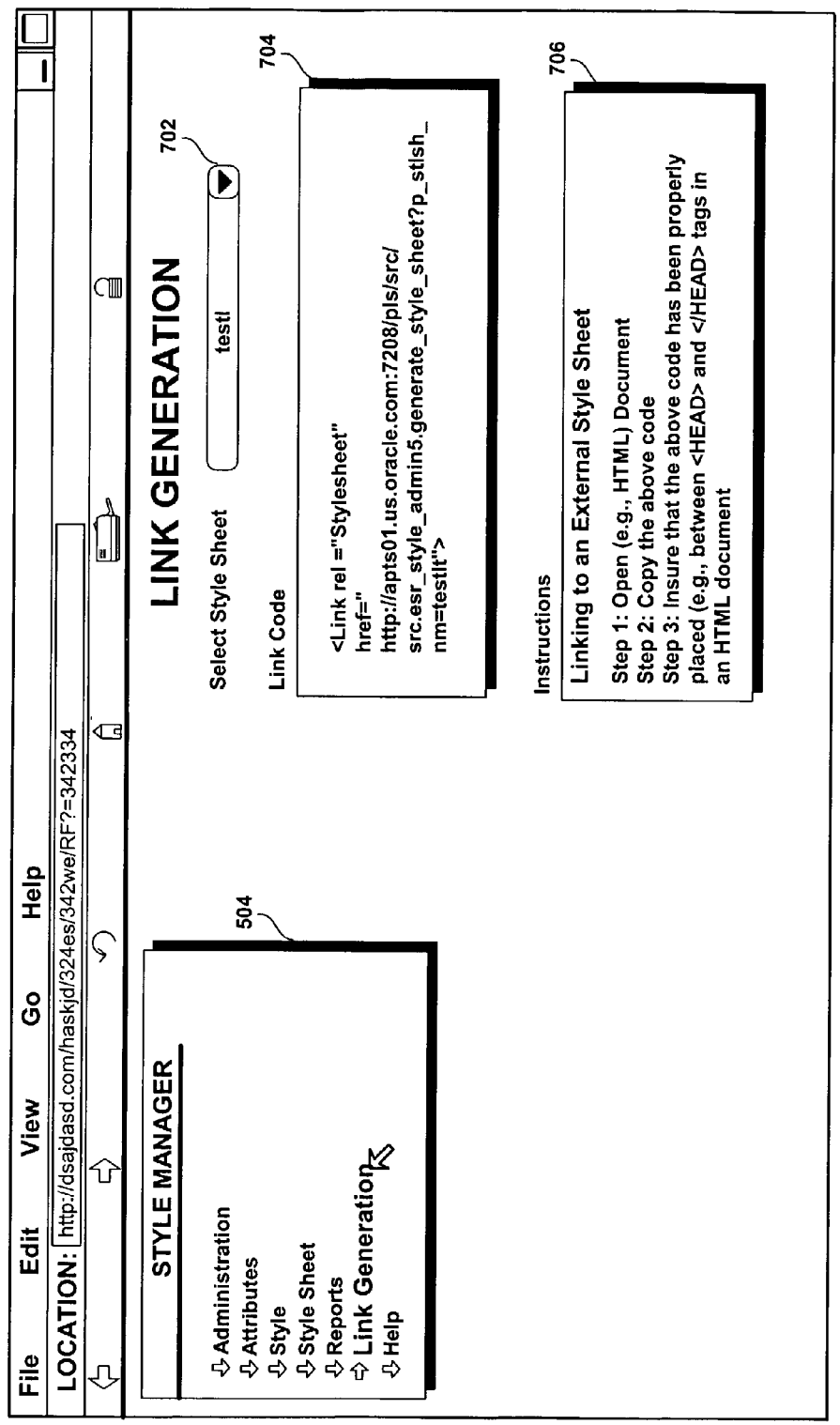
FIG. 7 is a flowchart of a method of managing styles in electronic documents, according to an embodiment of the present invention.

Selecting Link Generation from the control panel 404 may result in the exemplary layout 700 shown in FIG. 7. As shown, the user may be given the ability to select one of the style sheets 106 stored in the repository 302, from a drop down list 702, for example. Upon selecting the desired style sheet 106, the present invention generates a linking statement, as shown in the window 704 in FIG. 7. In the illustrative example of FIG. 7, the user has selected a style sheet 106 called "test1" from the drop down choices at 702. A linking statement effective to link an electronic document to the selected style sheet 106 is shown in the window 704, which shows the location (e.g., a Universal Resource Locator (URL)) of the selected "test1" style sheet in the repository 302. Such a linking statement may then, as detailed in window 706, be embedded into selected electronic document(s) by, for example, copying and pasting the linking statement in the processing instructions in the electronic document. For example, if the electronic document to which the selected style sheet is to be linked is an HTML document, the copied linking statement shown in 704 may be pasted between the start <HEAD> tag and the end </HEAD> tag, as shown at 706. Functionality may also be included to automatically and appropriately embed the generated linking statement into one or more selected electronic documents, as an alternative to the manual cut and paste methodology outlined above.

Figure 8:
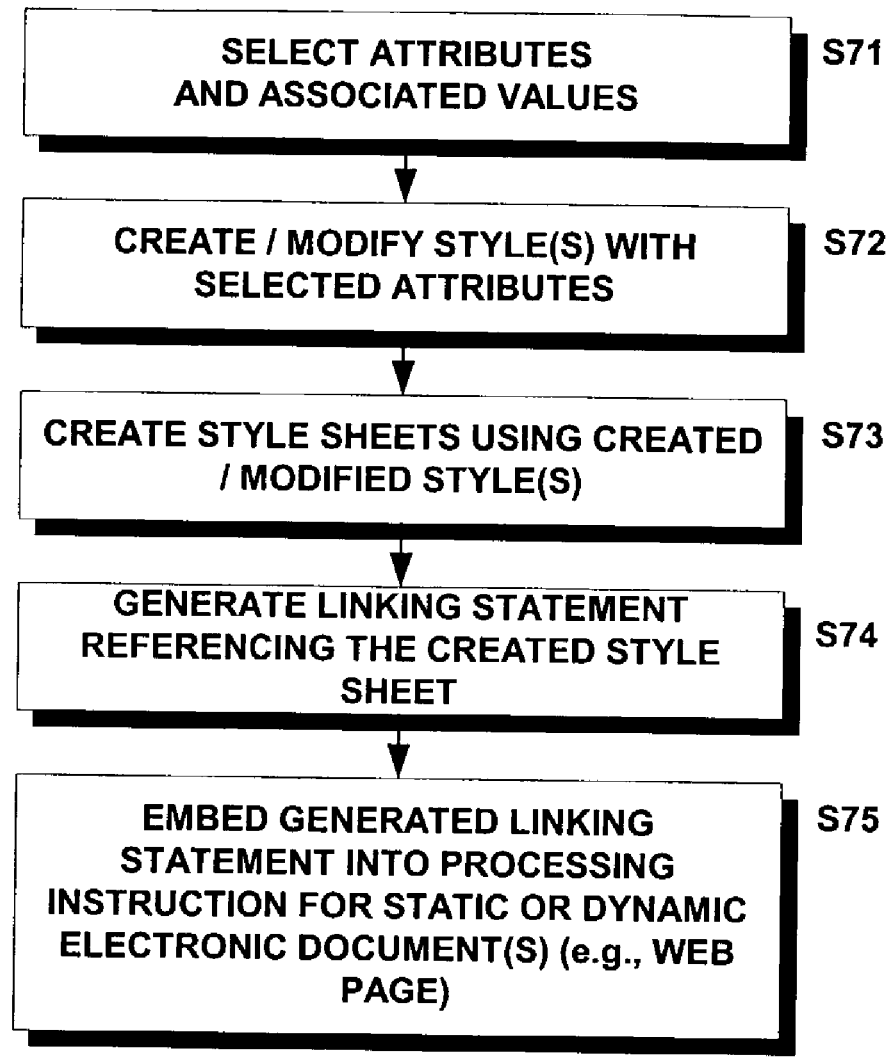
FIG. 8 shows the generation of a linking statement to be embedded in one or more electronic documents, according to an embodiment of the present invention.

FIG. 8 is a flowchart of a method of managing styles in electronic documents, according to an embodiment of the present invention. As shown therein, step S81 calls for the selection of attribute and values thereof, such as from a pick list of predetermined values. New values for the selected attribute may be defined as needed and thereafter selected. For example, the size attribute may be selected and a value of 10 pt may be selected as the value of the size attribute. Alternatively or in addition to step S81, step S82 may be carried out in which one or more styles are created and/or modified with the selected attributes and/or with the previously selected constituent attribute and value pairs of the style(s) to be applied to the electronic document. That is, one or more new styles may be defined, composed of newly selected attribute-value pairs. Moreover, one or more pre-existing styles may be modified, in that one or more of the constituent attributes thereof may be changed or deleted and/or new attribute-value pairs added thereto. As shown in S83, a new style sheet may be created, using the defined, modified and/or selected styles. After the style sheet has been created in this manner and saved in the central database driven repository 302, a linking statement may be generated and embedded into the electronic document or documents. Specifically, a statement that references the created style sheet may be generated and embedded into the electronic documents. Thereafter, when the electronic documents containing such a statement are rendered, the processing instructions therefor may access the central database driven repository 302 in which the style sheet referenced by the linking statement is stored, retrieve the style sheet and render the electronic document according to the style(s) defined in the retrieved style sheet. For example, the style sheet created in S83 may be called "firststyl.css". The linking statement generated in step S84 may follow the syntax of the HTML "link" statement, as defined, for example, in Danny Goodman, *Dynamic HTML, The Definitive Reference* O'Reilly & Associates Copyright 1998. The LINK element should be positioned inside the HEAD element and serves to establish a link to external documents such as, in this case, a style sheet. An embedded link, according to the present invention, may include an HTML tag of a Web page that references an external source for the Web page's style sheet. A skeleton HTML file with an embedded linking statement may resemble the following example:

<HTML>
<HEAD>
<LINK REL=STYLESHEET TYPE="text/css" HREF="firststyl.css">
</HEAD>
<H1>Heading here</H1>
<P>Paragraph here.</P>

</BODY>
</HTML>

The REL element defines the relationship (in this case, a style sheet) between the current element and the destination of the link. The TYPE element advises the browser of the content type (in this case, a text cascading style sheet) of the destination file or resource. The HREF="firststyl.css" line specifies the URI of the destination of the link. The destination of the link is firststyl.css, which is the name given to the style sheet, which is formatted as a cascading style sheet (CSS) in this example. The URI may be a complete or a relative URL. The URI of the destination of the link, according to the present invention, may be a PL/SQL package that generates all of the styles defined in the identified style sheet. This occurs quite rapidly and is transparent to the user of the computer that requests the electronic document.

Such a linking statement (also shown at 314 in FIG. 3), according to the present invention, may be generated using the created or modified style sheet containing the previously defined styles and attribute—value pairs. Such a linking statement may then be embedded, either manually or automatically into selected electronic documents, as shown at S85. Thereafter, upon rendering these electronic documents, the linking statement will be evaluated and the style sheet contained therein will be accessed and will control the appearance of the rendered electronic document. According to an embodiment of the present invention, the external source referenced by the link tag may include a PL/SQL (Procedural Language/Structured Query Language) package that accepts a style sheet name (firststyl.css in the example above) and generates the styles for the linked Web pages by appropriately accessing the repository 302.

Hardware Description

Figure 9:
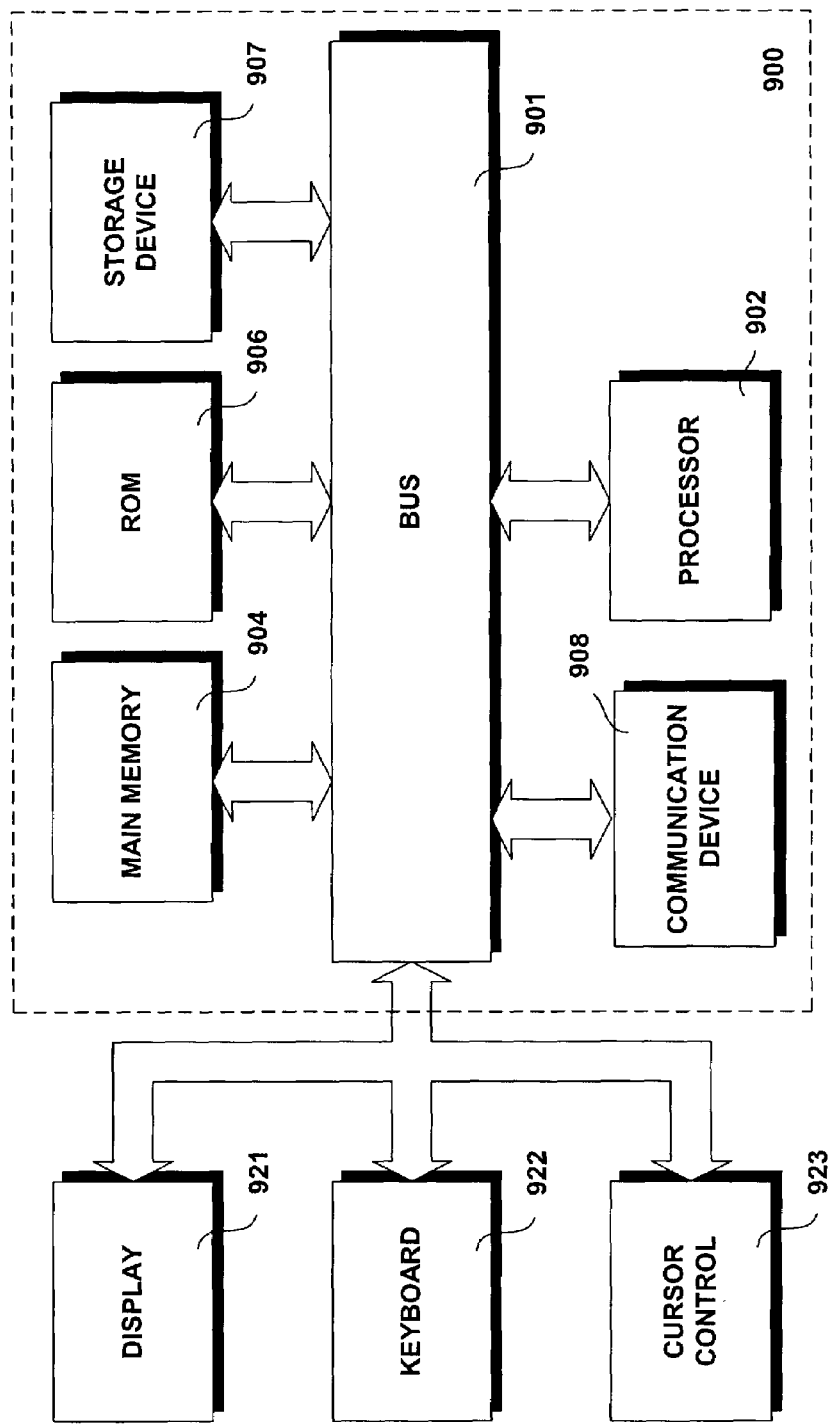
FIG. 9 is a block diagram of a computer with which the present invention may be practiced.

FIG. 9 illustrates a block diagram of a computing device 900 with which an embodiment of the present invention may be implemented. Computing device 900 includes a bus 901 or other communication mechanism for communicating information, and a processor 902 coupled with bus 901 for processing information. Computing device 900 further comprises a random access memory (RAM) or other dynamic storage device 904 (referred to as main memory), coupled to bus 901 for storing information and instructions to be executed by processor 902. Main memory 904 also may be used for storing temporary variables or other intermediate information during execution of instructions by processor 902. Computing device 900 may also include a read only memory (ROM) and/or other static storage device 906 coupled to bus 901 for storing static information and instructions for processor 902. A data storage device 907, such as a magnetic disk or optical disk, may be coupled to bus 901 for storing information and instructions. A communication device 908, such as a modem or network (such as Ethernet, for example) card is also coupled to the bus 401 to provide access to a network, such as shown at 304 in FIG. 3.

The computing device 900 may also be coupled via bus 901 to a display device 921, such as a cathode ray tube (CRT), for displaying information to a computer user. An alphanumeric input device 922, including alphanumeric and other keys, is typically coupled to bus 901 for communicating information and command selections to processor 902. Another type of user input device might be the user's own voice or cursor control 923, such as a mouse, a trackball, or cursor direction keys for communicating direction information and command selections to processor 902 and for controlling cursor movement on display 921.

The present invention is related to the use of computing device 900 configured to manage style sheets in electronic documents according to the present invention, as disclosed above. According to one embodiment, the processing may be carried out by one or more computing devices 900 in response to processor(s) 902 executing sequences of instructions contained in memory 904. Such instructions may be read into memory 904 from another computer-readable medium, such as data storage device 907 and/or from a remotely located server. Execution of the sequences of instructions contained in memory 904 causes processor(s) 902 to implement the functionality described above. In alternative embodiments, hard-wired circuitry may be used in place of or in combination with software instructions to implement the present invention. Thus, the present invention is not limited to any specific combination of hardware circuitry and software.

While the foregoing detailed description has described preferred embodiments of the present invention, it is to be understood that the above description is illustrative only and not limiting of the disclosed invention. Those of skill in this art will recognize other alternative embodiments and all such embodiments are deemed to fall within the scope of the present invention. Thus, the present invention should be limited only by the claims as set forth below.

What is claimed is:

1. A computer implemented method for a user to manage styles in electronic documents, comprising:
   providing an attribute list that includes a plurality of individually user selectable attributes, each user selectable attribute defining a content-independent property of an element in an electronic document;
   enabling the user to select at least one attribute from the attribute list and a value for each selected attribute independently of an existing style;
   defining at least one new uniquely identifiable style that includes the at least one user-selected attribute from the provided attribute list and the selected value for each selected attribute;
   providing a style list that includes user-selectable styles that include the defined style and at least one additional style;
   enabling the user to select at least one style from the provided style list;
   defining and storing a style sheet, the defined style sheet including at least one user-selected style from the provided style list, the defined style sheet being configured to control an appearance of the electronic document upon being linked thereto, and
   generating a linking statement to link the defined and stored style sheet to the electronic document.

2. The method of claim 1, further including a step of embedding the generated linking statement in the electronic document, the embedded linking statement enabling the appearance of the electronic document to be controlled by the defined style sheet when the electronic document is rendered.

3. The method of claim 1, wherein the electronic document includes at least one of XML and HTML.

4. The method of claim 1, wherein the electronic document includes a Web page.

5. The method of claim 1, further comprising enabling a modification of a style associated with a predefined tag.

6. The method of claim 1, further comprising enabling a retrieval of a stored style sheet from a repository and enabling the at least one of the styles of the retrieved style sheet to be modified and enabling a generation and embedding of a linking statement referencing the modified style sheet in the electronic document.

7. The method of claim 1, further comprising enabling a selective generation of configurable reports to selectively match electronic documents with at least one of selected attributes, selected styles and selected style sheets.

8. A system for a user to control an appearance of an electronic document, comprising:
   a database driven repository, the repository being configured to store a plurality of individually user-selectable attributes that are user selectable independently of any existing style, a plurality of user-selectable styles and a plurality of style sheets that include selected ones of the plurality of user-selectable attributes and styles, each stored attribute defining a content-independent property of an element in the electronic document, each stored style including a plurality of selected attributes and each stored style sheet including at least one selected style;
   a style manager application configured to selectively access the repository to provide the user with a style list of the plurality of user-selectable styles, to create a new style sheet defined by at least one of the plurality of user-selectable styles selected by the user from the style list and to generate a linking statement, the linking statement referencing the new style sheet and controlling the appearance of the electronic document, and
   a computer configured to run the style manager application.

9. The system of claim 8, wherein the style manager application is further configured to embed the generated linking statement in the electronic document.

10. The system of claim 8, wherein the electronic document includes one of XML and HTML.

11. The system of claim 8, wherein the electronic document includes a Web page.

12. The system of claim 8, wherein the style manager application is further configured to modify a style associated with a predefined tag.

13. The system of claim 8, wherein the style manager application is further configured to retrieve a stored style sheet from the repository and to enable the at least one of the user-selectable styles to be modified and to generate and embed a linking statement to the modified style sheet in the electronic document.

14. The system of claim 8, wherein the style manager application is further configured to enable a selective generation of configurable reports to selectively match electronic documents with at least one of selected attributes, selected styles and selected style sheets.

15. A computer-implemented method for a user to manage an appearance of electronic documents, comprising the steps of:
   defining a first style sheet, the first style sheet including a style, the style including an attribute and a value associated with the attribute, the attribute being selected by the user from a list of individually user-selectable attributes that is generated, displayed for and made available for selection by the user independently of any existing style;
   storing the defined first style sheet, the attribute and the value in a database driven repository at a first identified location;
   generating a first linking statement referencing the first identified location;
   embedding the generated first linking statement in a first electronic document such that when the first electronic document is rendered, execution of the first linking statement causes the stored first style sheet to be accessed at the first identified location and the style included in the first style sheet applied to the first electronic document.

16. The method of claim 15, further comprising a step of retrieving the stored first style sheet at the first identified location, modifying the retrieved style sheet to create a second style sheet, storing the second style sheet in the database driven repository at a second identified location, generating a second linking statement referencing the second style sheet at the second identified location and embedding the generated second linking statement in a second electronic document.

17. The method of claim 15, further including a step of embedding the first linking statement in a second electronic document.

18. The method of claim 15, further comprising the step of generating a report detailing all electronic documents in which the first linking statement has been embedded.

19. The method of claim 15, further comprising the step of generating a report detailing all electronic documents whose appearance is at least partially controlled by one of a selected style sheet, a selected style and a selected attribute.

* * * * *

UNITED STATES PATENT AND TRADEMARK OFFICE
CERTIFICATE OF CORRECTION

PATENT NO. : 7,117,429 B2 Page 1 of 1
APPLICATION NO. : 10/171271
DATED : October 3, 2006
INVENTOR(S) : Chaitra Vedullapalli et al.

It is certified that error appears in the above-identified patent and that said Letters Patent is hereby corrected as shown below:

On Title Page, Item (54), after "STYLES" insert -- IN --.

Signed and Sealed this

Twelfth Day of December, 2006

JON W. DUDAS
*Director of the United States Patent and Trademark Office*